(12) United States Patent
Hoelsaeter

(10) Patent No.: US 7,499,242 B2
(45) Date of Patent: Mar. 3, 2009

(54) SCALABLE AND EXPANDABLE UNITS FOR DATA STORAGE SYSTEM

(75) Inventor: Håvard Hoelsaeter, Oslo (NO)

(73) Assignee: Tandberg Data ASA, Oslo (NO)

( * ) Notice: Subject to any disclaimer, the term of this patent is extended or adjusted under 35 U.S.C. 154(b) by 485 days.

(21) Appl. No.: 10/976,472

(22) Filed: Oct. 29, 2004

(65) Prior Publication Data

US 2005/0146808 A1 Jul. 7, 2005

Related U.S. Application Data

(60) Provisional application No. 60/515,601, filed on Oct. 30, 2003.

(51) Int. Cl.
*G11B 15/68* (2006.01)
(52) U.S. Cl. .................... 360/92.1; 369/30.39
(58) Field of Classification Search ............... 360/92, 360/92.1; 369/30.39, 30.43, 30.45; 720/600
See application file for complete search history.

(56) References Cited

U.S. PATENT DOCUMENTS

| | | | |
|---|---|---|---|
| 4,802,035 A | | 1/1989 | Ohtsuka |
| 4,812,629 A | | 3/1989 | O'Neil et al. |
| 4,910,619 A | | 3/1990 | Suzuki et al. |
| 5,285,335 A | | 2/1994 | Sato |
| 5,303,214 A | | 4/1994 | Kulakowski et al. |
| 5,508,859 A | | 4/1996 | Hu et al. |
| 5,548,567 A | | 8/1996 | Sawai |
| 5,781,368 A | | 7/1998 | Kotaki et al. |
| 5,867,003 A | | 2/1999 | Hashimoto et al. |
| 5,870,245 A * | | 2/1999 | Kersey et al. ................ 360/92 |
| 5,940,356 A * | | 8/1999 | Toumbas ................ 369/30.39 |
| 6,041,026 A * | | 3/2000 | Hammar et al. .......... 369/30.43 |
| 6,134,212 A | | 10/2000 | Pines et al. |
| 6,144,519 A * | | 11/2000 | Hanaoka et al. ............... 360/92 |
| 6,222,699 B1 * | | 4/2001 | Luffel et al. .................. 360/92 |
| 6,271,982 B1 | | 8/2001 | Helmick |
| 6,473,371 B1 * | | 10/2002 | White ..................... 369/30.72 |

(Continued)

FOREIGN PATENT DOCUMENTS

EP 1 063 648 A2 12/0000

(Continued)

*Primary Examiner*—Angel A. Castro
(74) *Attorney, Agent, or Firm*—Schiff Hardin LLP

(57) ABSTRACT

A data storage and retrieval device is provided which includes a tape drive for recording data on to and reading data from data cartridges, at least one storage magazine in which the data cartridges are stored, and a cartridge shuttle which moves the data cartridges between the tape drive and the storage locations and the storage magazine. The present data storage and retrieval device is housed with a housing that is configured to fit a standard form factor for computer network related devices, such as the "U" form factor. The data storage and retrieval device is scalable for different form factors by exchanging only a limited number of parts in the apparatus while retaining the majority of parts and components without change. For example, a change in U form factor may be accomplished by varying only a few components in an elevator portion of the cartridge shuttle and by providing a taller or shorter storage magazine in the housing. Greater or lesser storage capacity may also be provided for the device without changing the U form factor by extending the depth of the device, which is readily accomplished by providing different length belts for the cartridge shuttle and a longer or shorter storage magazine having more or fewer slots.

7 Claims, 8 Drawing Sheets

U.S. PATENT DOCUMENTS

| | | |
|---|---|---|
| 6,515,822 B1 | 2/2003 | White et al. |
| 6,570,734 B2 * | 5/2003 | Ostwald et al. ............... 360/92 |
| 6,621,655 B2 * | 9/2003 | White et al. .................. 360/92 |
| 6,693,759 B2 * | 2/2004 | Owens et al. ................. 360/69 |
| 6,829,116 B1 * | 12/2004 | Owens et al. ................. 360/69 |
| 6,983,469 B2 * | 1/2006 | Steinhilber ................. 720/600 |
| 2003/0086202 A1 | 5/2003 | Hoelsaeter |

FOREIGN PATENT DOCUMENTS

| | | |
|---|---|---|
| GB | 2 381 935 A | 5/2003 |
| WO | WO 97/17701 | 5/1997 |

* cited by examiner

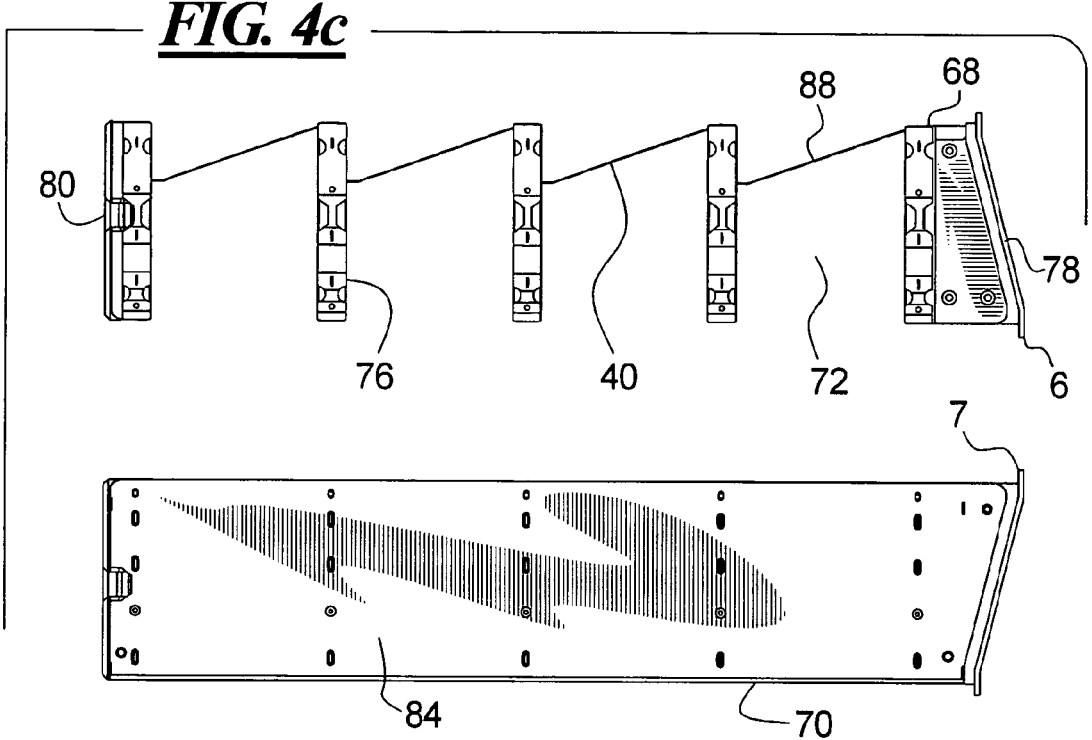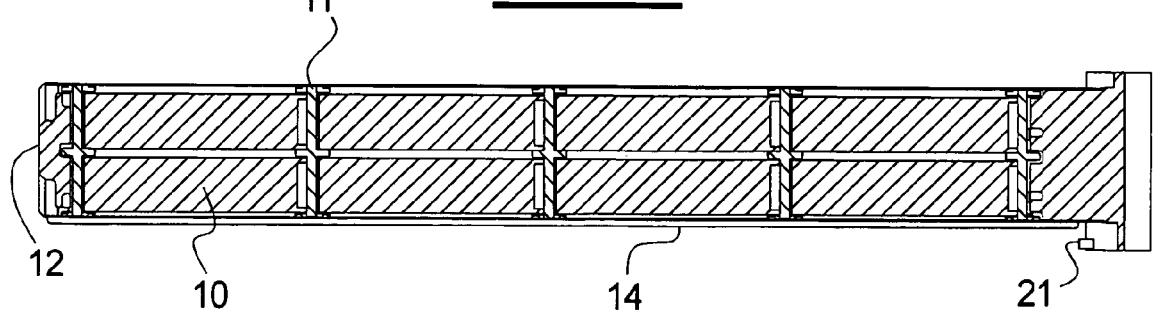

SCALABLE AND EXPANDABLE UNITS FOR DATA STORAGE SYSTEM

CROSS REFERENCE TO RELATED APPLICATION

This application claims the benefit of U.S. provisional patent application Ser. No. 60/515,601, filed Oct. 30, 2003, which is incorporated herein by reference.

BACKGROUND OF THE INVENTION

1. Field of the Invention

The present invention relates generally to a computer data archiving apparatus and, in particular to an automated data recording and playback apparatus utilizing tape cartridges.

2. Description of the Related Art

Computer systems and computer-based systems require data storage systems for storage of the computer data. To insure against loss of the data, data archiving systems have been developed. A common data archiving system includes one or more tape drives which utilize removable tape cartridges for recording and playback of the computer data. The tape cartridges have the benefit of large storage capacity and the ability to change cartridges to extend the storage capacity to a virtually infinite amount. However, manually operated tape drives require the presence of skilled personnel to exchange the tapes on a regular schedule.

So-called autoloaders have been developed which automate the exchange of the tape cartridges into and out of the tape drives. These autoloaders move tapes generally one at a time from storage magazines, which hold a number and store of tape cartridges, to the tape drive and, upon completion of recording and/or playback from the tape drive, back to a storage location in the storage magazine. These autoloaders are generally connected into a computer system or computer network and are provided with an appropriate number of tape cartridges in the storage magazines. Autoloaders having a single drive record the data onto tapes one at a time in the drives. Autoloaders systems having multiple tape drives permit data to be provided simultaneously to the multiple drives nearly simultaneously, thereby reducing the data backup time.

However, tape backup systems still suffer from the disadvantage that the transfer rate for the data to the tape cartridge or from the tape cartridge is limited compared to the transfer rate of data within most other components in the computer system or network. The result is that data backup and/or data archiving generally must be performed during downtimes for the computer system. For example, for a business that shuts down each day, the data backup is generally performed while the business is shut down. However, many businesses operate on a 24-hour schedule so that there is no ideal time for performing data backup. Even for those businesses which perform the data backup for the computer system during the hours when the business is shut down, failure of the computer system during working hours may result in the loss of some or all of a day's data since the failure may result in a complete loss of data since the last backup.

It would be a benefit if a data archiving system were provided which possesses enough speed to perform the backup during the full operation of the computer system or network. It would also be an advantage if a data archiving system were provided with a high data transfer rate and a small backup window.

SUMMARY OF THE INVENTION

The present invention provides a data storage system utilizing tape cartridges for recording data in a tape drive, which is supplied automatically with the cartridges via a cartridge shuttle. The cartridge shuttle moves the tape cartridges between the tape drive and storage locations in tape storage magazines. The present apparatus, commonly referred to as an "auto loader" is housed within a housing, which is dimensioned to fit a standard form factor. Advantages are provided in the present invention by configuring the various operational components of the present "auto loader" to be replaceable by similar components having different dimensions so as to permit construction of an "auto loader" of a size to conform to a different form factor but without requiring re-design of the components. In other words, the present "auto loader" may be configured to scale to many different sizes while using common parts for each of the different sized units and only requiring changes in dimensions of a few key components. In this way, "auto loader" systems can be provided to fit different sized mounting locations or to accommodate different storage capacities without incurring high cost for re-design of differently proportioned components.

BRIEF DESCRIPTION OF THE DRAWINGS

FIG. 4c is a side elevational view of the two storage magazines of FIG. 4b;

FIG. 4d is a longitudinal cross section through the cartridge storage magazine of FIG. 4c;

DETAILED DESCRIPTION OF THE PREFERRED EMBODIMENTS

The present data storage and retrieval device provides improvements on the data storage and retrieval device disclosed in U.S. Provisional Patent Application Ser. No. 60/516,542, filed Oct. 31, 2003, and the non-provisional application which claims the benefit thereof, as well as U.S. Provisional Patent Application, Ser. No. 60/515,738 filed Oct. 30, 2003, and the non-provisional application which claims the benefit thereof, all of which are incorporated herein by reference.

Figure 1:
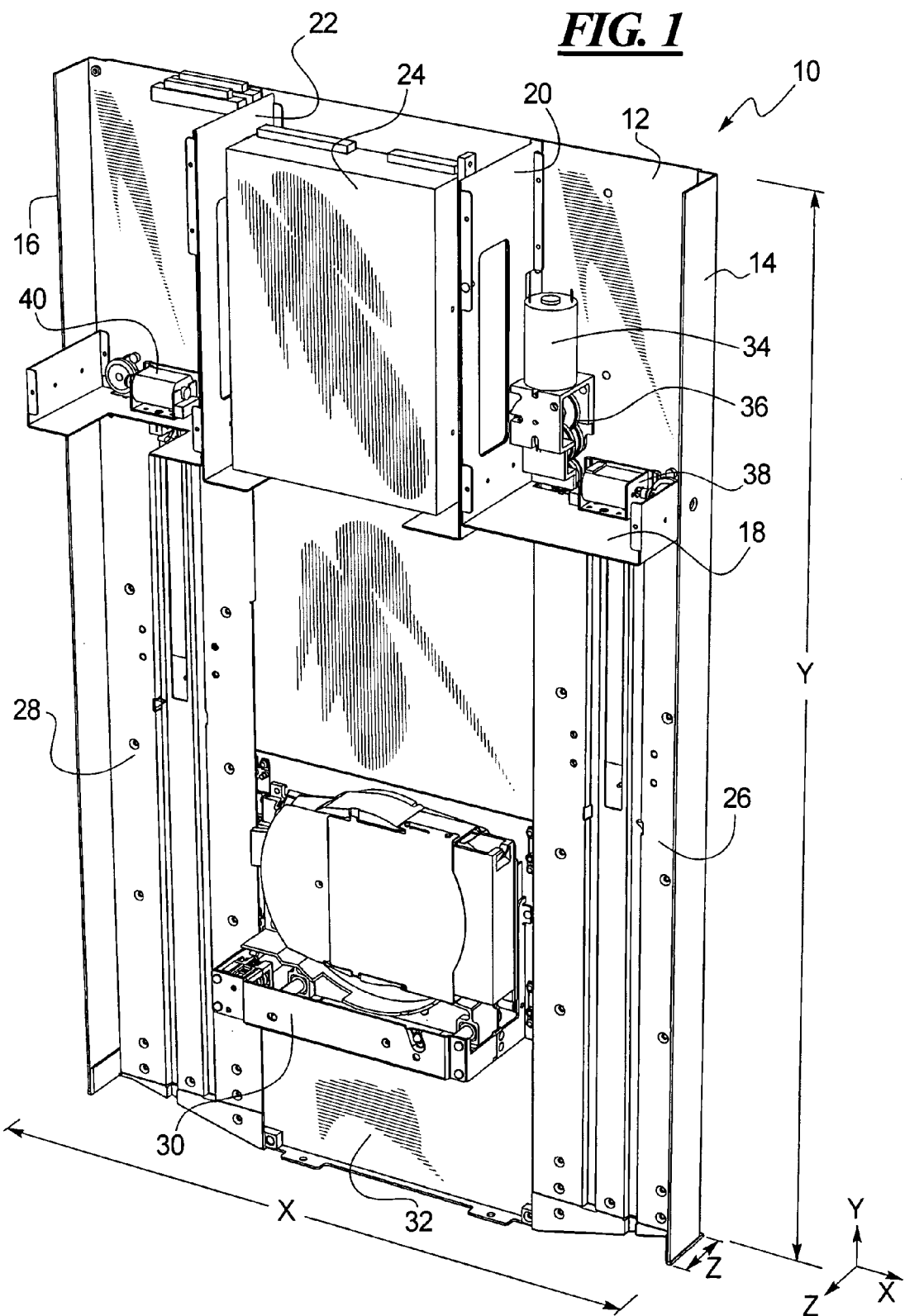
FIG. 1 is a top perspective view of a frame, tape drive and cartridge shuttle of an auto loader according the principal of the present invention.

Referring first to FIG. 1, an "auto loader" frame 10 has a substantially rectangular planer configuration with a bottom 12, side rails 14 and 16 and a transverse wall 18. Extending from the transverse wall 18 is a pair of longitudinal wall portions 20 and 22 between which is mounted a tape drive 24. The tape drive 24 is operable to read data from and write data to tape cartridge.

On the lower part 12 on the opposite side of the transverse wall 18 from the tape drive 24 are provided a pair of magazine mounting rails 26 and 28 on which storage magazines (as will be shown later) are mounted. Between the mounting rails 26 and 28 is a cartridge shuttle 30 that is movable along a transfer space 32 between the mounting rails 26 and 28. A motor 34 is provided adjacent the tape drive 24 and includes a transmission 36 which operate to move the cartridge shuttle 30 longitudinally along the transfer space 22.

Mounted on the transverse wall 18 are magazine locking motors 38 and 40, which selectively lock and unlock storage magazines (as will be shown later) in position on the support rails 26 and 28, respectively. A printed circuit board 42 is provided adjacent the tape drive 24 and behind the transverse wall 18. The printed circuit board 42 includes circuit elements for control and operation of the present auto loader, as well as providing for data transmission between a computer or network to which the auto loader is connected and the tape drive 24. The present device is controlled through firmware on the printed circuit board 42 as well as through software running on the computer system or computer network to which the present device is connected.

The frame 10 of the present auto loader is of a size and shape to fit into a standard computer rack. For example, the "U" form factors such as 1U, 2U, 3U, and 4U, have defined dimensions of standard rack positions for computer equipment racks. The racks have a standard width in an X direction corresponding to a length along a direction X as shown in FIG. 1. The standard "U" form factors provide for a 19-inch X dimension. The Y dimension of the auto loader apparatus, as indicated in FIG. 1 by the arrow corresponds to the longitudinal dimension of the device. The Y dimension may be varied according to the needs of the user without requiring redesign of the components within the auto loader.

Further, the Z dimension as indicated in the drawing corresponds to the height of the auto loader. The height is denoted in the standard form factors as a "U" dimension and may be selected by the user from among the 1U, 2U, 3U, or 4U standard form factors. The dimensions of the components within the present auto loader may be varied along the Z direction to provide different "U" form factors without changing the design of the components. Thus, the present auto loader may be adapted to a users needs as to the space, which is consumed by the auto loader as to the storage capacity, which the auto loader capacity shall have. The variation in the Y and Z directions can be accomplished by using the same modular parts with only a few add on parts or specific parts for each "U" form factor.

The mainframe or chassis 12 is identical for all "U" form factors within the same Y dimension. The frame need not be varied for different devices with the Z direction. Of course, for different Y dimensioned autoloaders, different frames 12 are provided.

In the following description, the parts which are exchanged or replaced to change the height or U form factor of the present device are referred to as U specific components.

Figure 2:
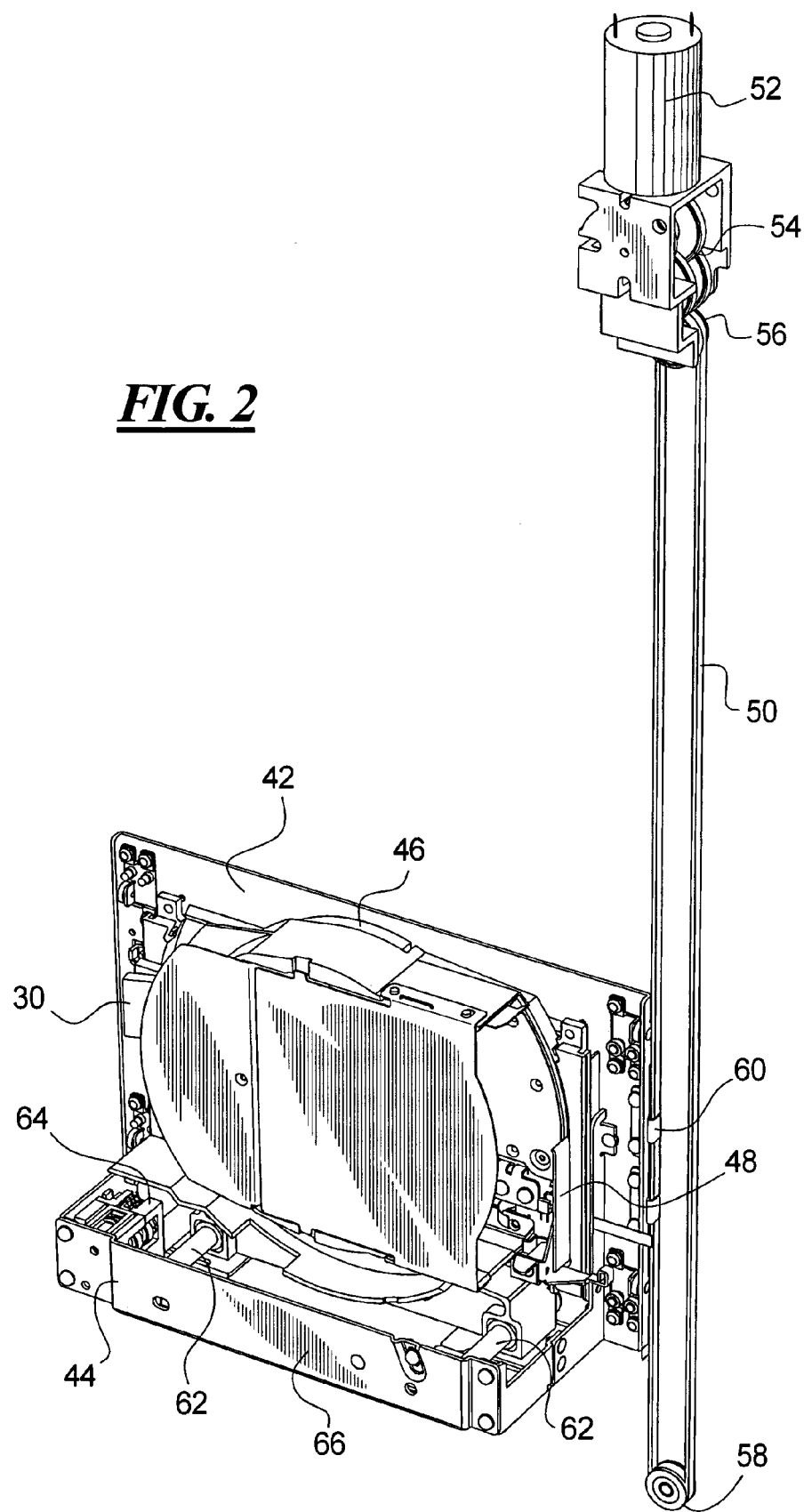
FIG. 2 is a top perspective view of the cartridge shuttle of the present "auto loader" along with its traverse drive.

With reference to FIG. 2, the cartridge shuttle 30 includes a shuttle base 42 on which is provided an elevator assembly 44 for lowering and raising a cartridge turntable or rotation housing 46 that in turn holds a cartridge retrieving and ejecting apparatus 48, such as a cartridge picker.

The cartridge shuttle 30 has moved within the autoloader device by a belt 50 that is driven through a motor 52 and a reducer gear transmission 54 driving a drive pulley 56. The belt 50 is connected to second pulley 58 that is also mounted in the autoloader device. The shuttle base or chassis 42 is held to the belt 50 by belt clamps 60. The elevational movement of the cartridge held in the shuttle 30 is accomplished through rotation of threaded shafts 62, which are rotated through a belt driven by an elevator motor 64. The elevator motor and threaded shafts are held by an elevator support frame 66. The threaded shafts 62 carry threaded nuts attached to the rotator platform 46 to lift the rotator platform as needed. The rotator platform 46 includes a spur gear and spur gear ring (not shown) to cause rotation of the cartridge holding housing. The cartridge retrieving and injecting apparatus 48 moves within the cartridge holding housing to draw in or push out of their cartridges.

The form factor of the present device may be varied in the Y direction by changing the length of the belt 50 to accommodate different formats of the autoloader apparatus. No other change in components is required for varying the Y dimension of the shuttle traverse assembly.

Figure 3:
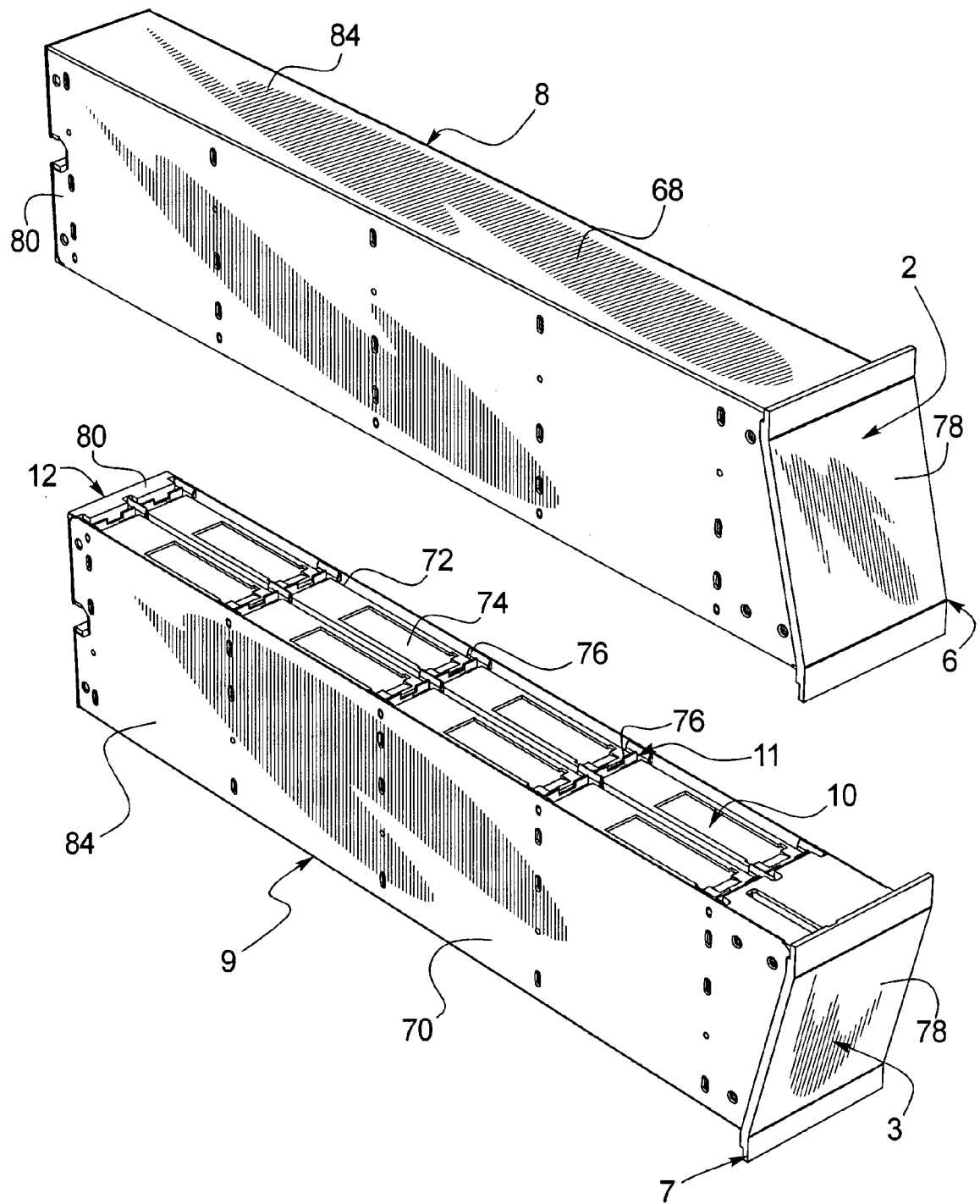
FIG. 3 is a top perspective view of two cartridge storage magazines for use in the present auto loader apparatus.
Figure 4A:
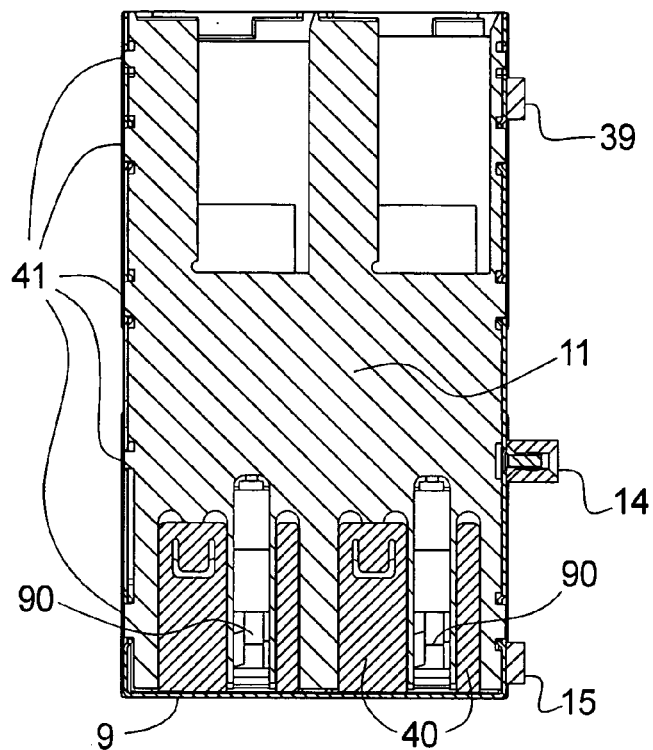
FIG. 4a is a cross sectional view through a cartridge storage magazine.
Figure 4B:
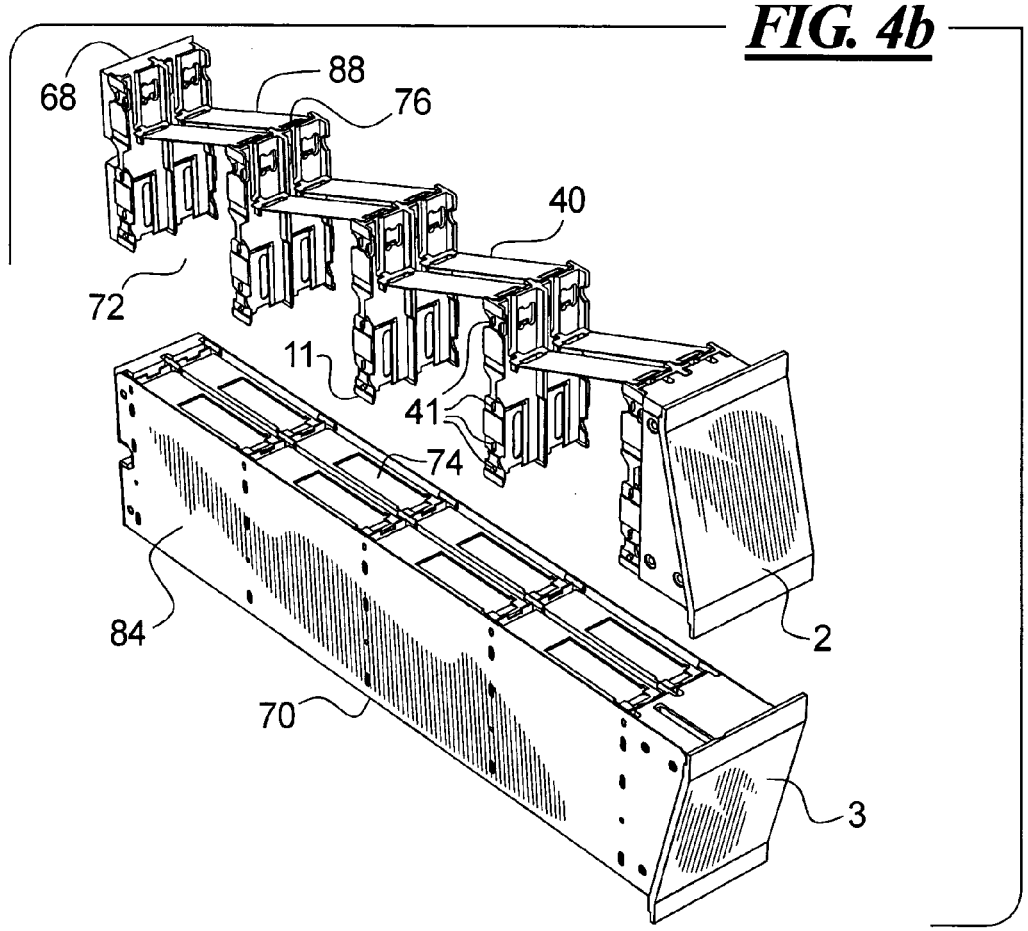
FIG. 4b is a perspective view of the two cartridge storage magazines of FIG. 3 wherein the outer casing is removed from the upper storage magazines.
Figure 5A:
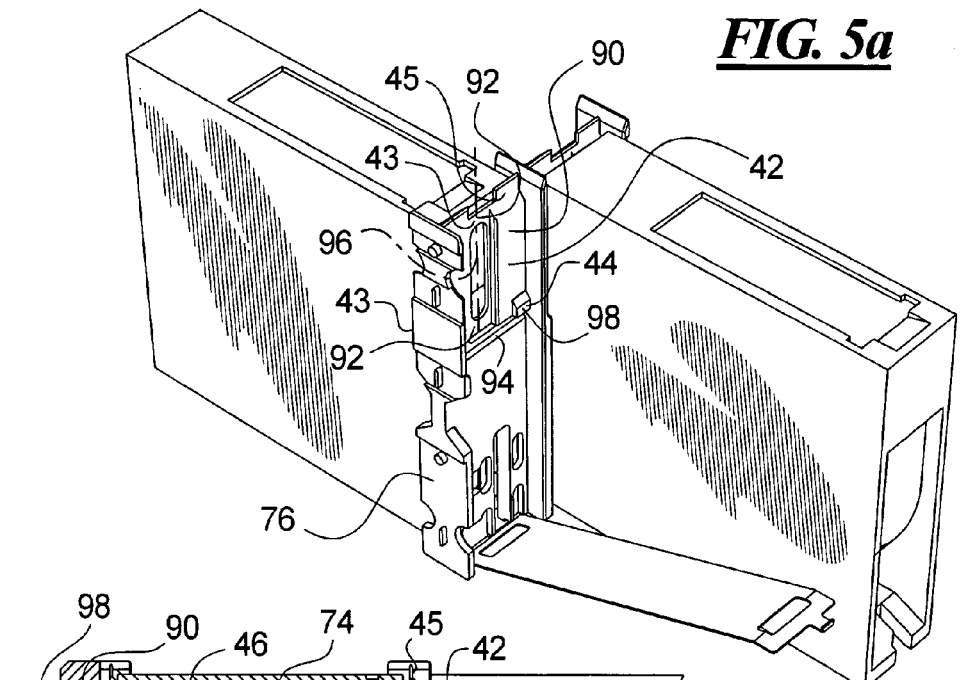
FIG. 5a is an enlarged fragmentary perspective view of a cartridge latch in the cartridge storage magazine.
Figure 5B:
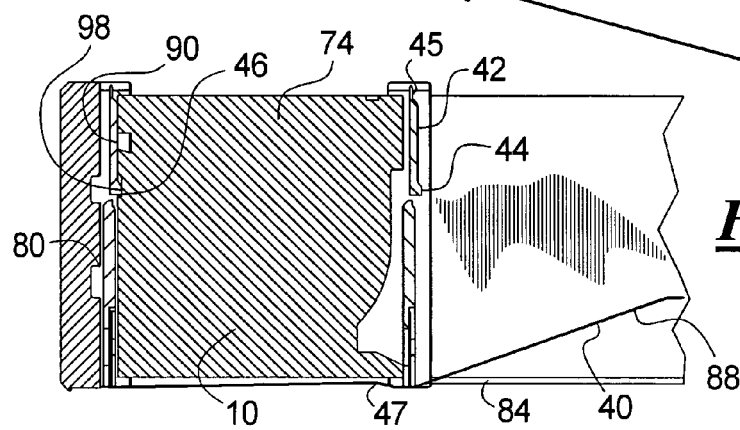
FIG. 5b is a cross section through a portion of the cartridge storage magazine of FIG. 5d.
Figure 5C:
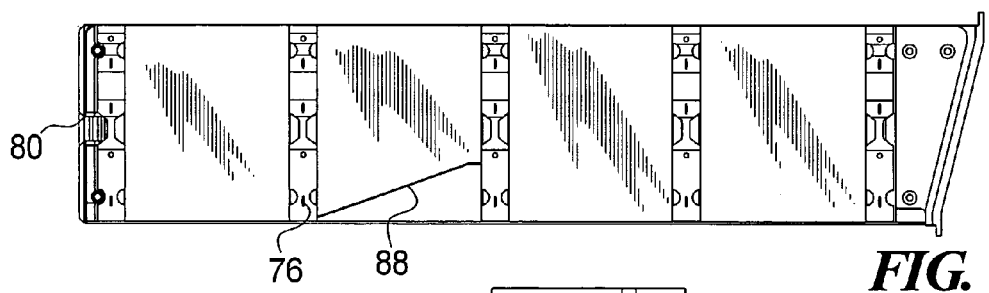
FIG. 5c is a side elevational view of the cartridge storage magazine with the outer casing removed.
Figure 5D:
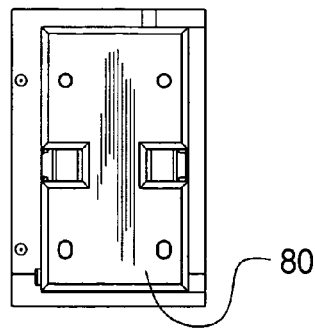
FIG. 5d is an end view of the cartridge storage magazine with the outer casing removed.

Turning to FIG. 3, the storage magazines 68 and 70 are mounted in the autoloader apparatus 10 on the rails 28 and 26. Each of the storage magazines 68 and 70 include a plurality of storage slots 72 into which is inserted data cartridges 74. The storage slots 72 are separated by divider walls 76. The storage magazines 68 and 70 also include front panels 78 and end caps 80.

In order to accommodate changes in the Y dimension of the autoloader apparatus, the storage magazines 68 and 70 are lengthened or shortened, as needed and may have more or fewer storage slots 72. This is accomplished by providing a greater or shorter length outer housing 84 which in the preferred embodiment is formed of sheet metal and by providing more or fewer separating walls 76. No other change is required in the parts or components for the storage magazines to accommodate a change in the Y dimension of the autoloader.

FIGS. 4A through 4D are various views of the storage magazines 68 and 70 showing the interior of the storage slots 72 between the partition walls 76. The partition walls 76 extend primarily in the vertical direction between adjacent data cartridges and there is no requirement that a horizontal shelf be provided between the data cartridges. Further, ejection springs 88 are disposed in each of the slots 72 to push the data cartridges 74 out of the slot when released by a latch. The latch is provided according to FIG. 4A as a flexible portion 90 that engages the data cartridges 74 when they are positioned fully inserted into the slots 72.

As can be seen, the scalability of the storage magazine is provided by including fewer or greater numbers of partition walls 76 along the length of a shorter or longer magazine housing 84 to expand the present apparatus in the lie direction.

It is also possible to scale the present device in the vertical direction or Z direction, which is accomplished by providing partition wall 76 having greater or fewer numbers of cartridge engaging spaces so that the storage magazines are either taller or shorter and have either greater or fewer numbers of cartridges stacked in each column.

FIGS. 5A through 5D provide further details on the storage magazines including showing the latch 90 for the data cartridge in the partition wall 76. The latch 90 flexes on flexible members 92 that are cut free from the partition wall 76 by a slot 94 and a slot 96. A projection 98 that extends into an opening in the data cartridge 74. It is readily appreciated how the partition wall 76 can be expanded in height to accommodate a greater number of data cartridges by simply multiplying the structure required for each of the data cartridges so as to provide scalability of the present storage magazine.

Figure 6:
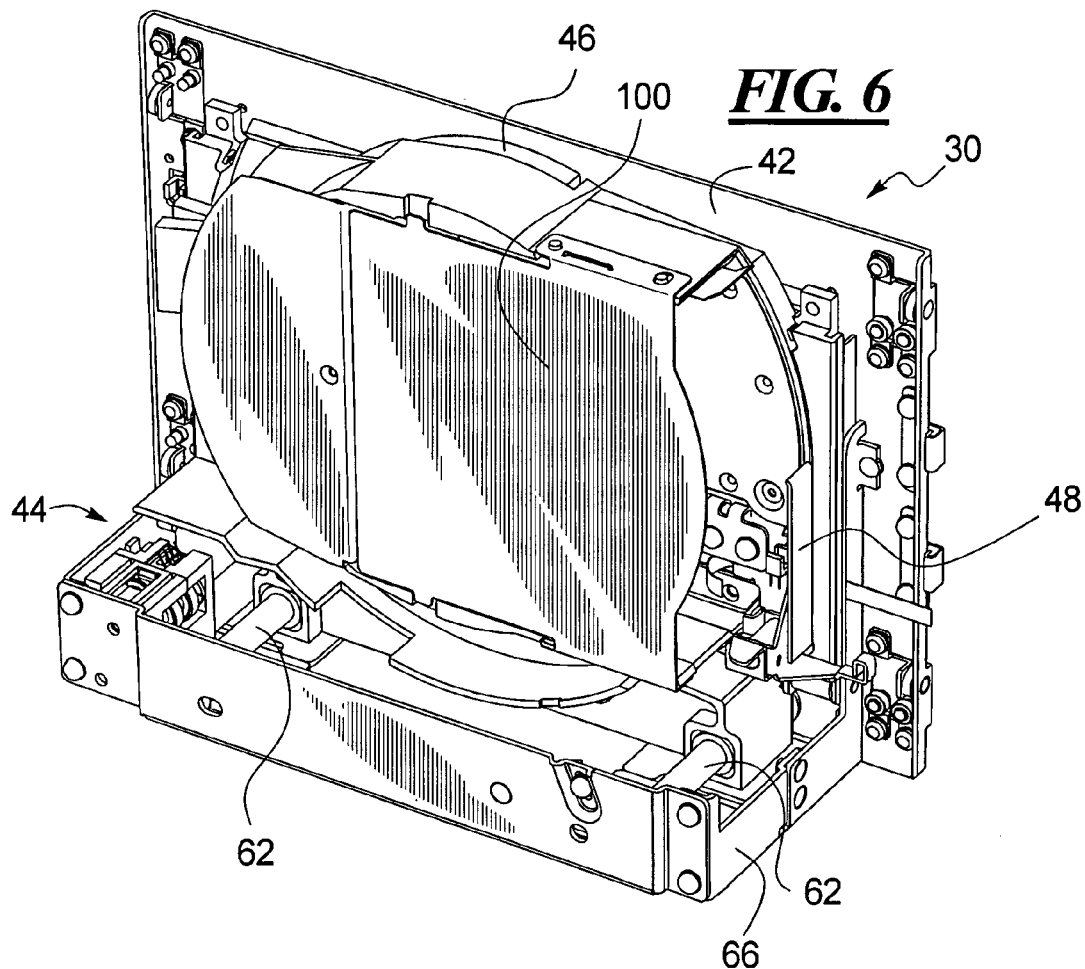
FIG. 6 is a top perspective view of the cartridge shuttle of the present auto loader system.

FIG. 6 shows and enlarged detailed view of the cartridge shuttle 30 the chassis 42 can remain the same size for all sizes of the shuttle 30 as can the rotator assembly 46 and the cartridge housing 100. The cartridge retrieving and ejecting apparatus 48 can remain the same dimensions as well. For scalability in the vertical or Z direction, the present invention provides that the elevator support frame 66 is replaced by shorter or taller frames as needed for a greater or lesser height in the Z direction for the present autoloader. This corresponds to different U sizes. In addition to changing the size of the elevator support frame 66, the length of the threaded shafts 62 are changed to accommodate different vertical runs of the elevator mechanism 44. The other components in the cartridge shuttle can remain the same for different scaled sizes of the present device.

Figure 7:
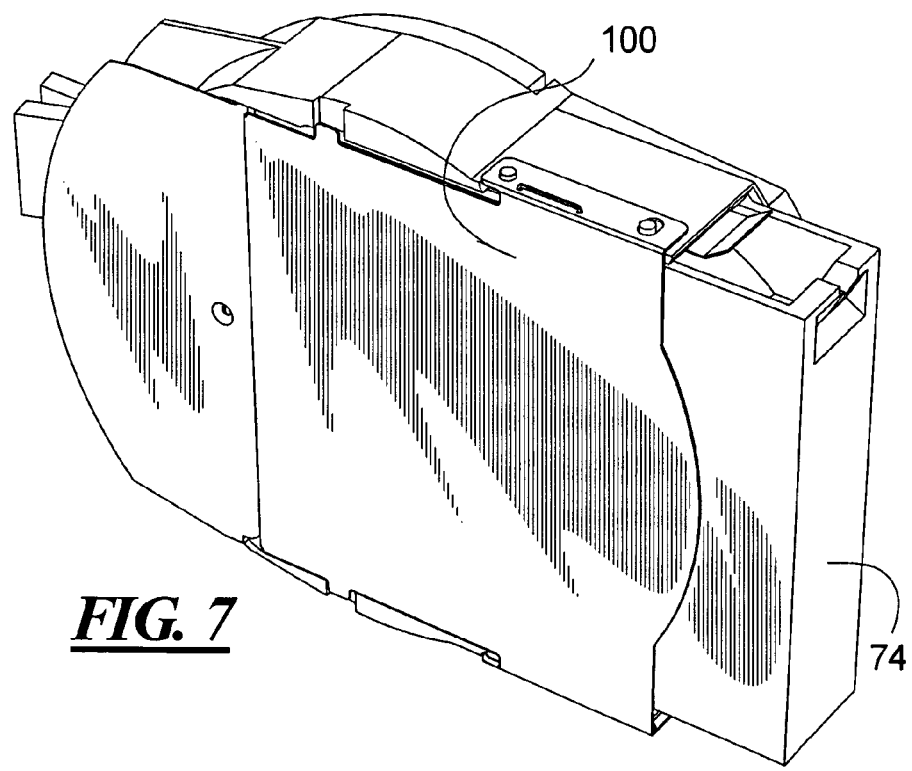
FIG. 7 is a top perspective view of the cartridge rotating apparatus of the cartridge shuttle of FIG. 6.

In FIG. 7 the cartridge holder 100 has a data cartridge 74 mounted therein. Since the data cartridges are of a standard size, all of the scalability of the present autoloader for cartridges using a particular size is in parts other than the cartridge holder 100. In other words, no change needs to be made in this component so long as cartridges of a given size are used, no matter what change is made in the scale of the autoloader itself.

For autoloaders which utilize cartridges of a different format, the cartridge housing 100 is exchanged for a cartridge housing of an appropriate size to fit the cartridge format. Likewise, the storage magazines would be sized according to the cartridge format.

Figure 8:
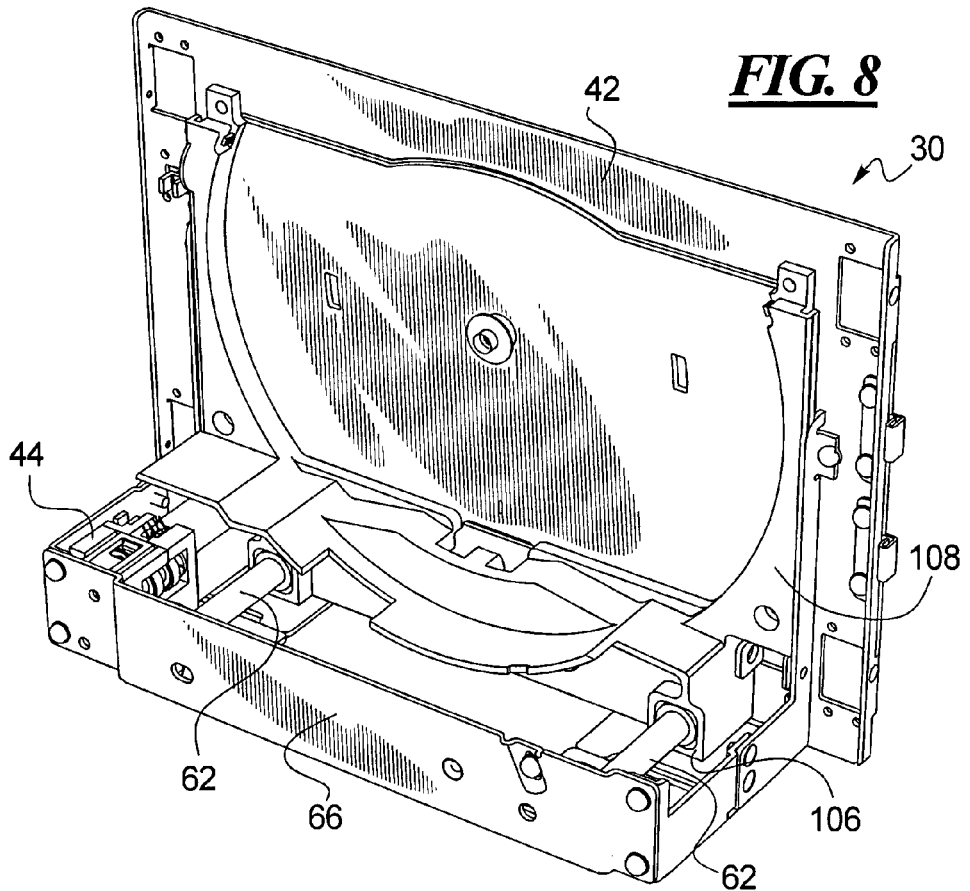
FIG. 8 is a top perspective view of the cartridge shuttle base of the cartridge shuttle of FIG. 6.

Referring now to FIG. 8, the chassis 42 of the present shuttle 30 includes the elevator mechanism 44 which is scaled by providing a different elevator support frame 66 and different lengths of shredded shafts 62, as discussed above. The threaded shafts carry threaded nuts 106 on which is supported the elevator platform 108 that moves vertically as the shafts 62 are rotated. Scaling of the present autoloader in either the Y or Z directions does not require changing of the elevator platform 108 or chassis 42.

Figure 9:
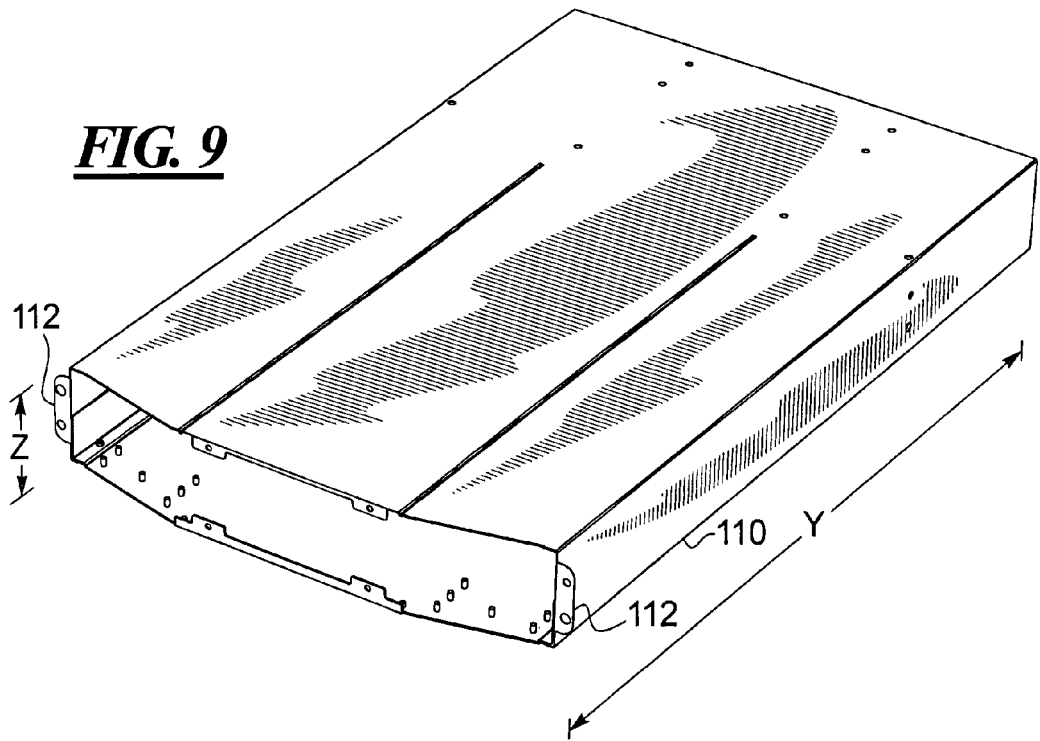
FIG. 9 is a side perspective view of a housing of the present auto loader apparatus.

Lastly, a housing 110 is shown in FIG. 9 which includes rack mounting flanges 112 to mount in a standard computer network rack. The housing 110 fits over the chassis 112 as shown in FIG. 1 to enclose the present autoloader. When the autoloader is scaled in the Y direction, the housing 110 has changed in length in the Y direction. When the autoloader is scaled in the Z direction, corresponding to different "U" sizes for rack bounded components, the housing 110 is increased in the Z direction to provide a greater or lesser height.

Thus, the present invention provides a scalable autoloader which may be increased in size or deceased in size readily while retaining use of the majority of components and parts therein. Only a few parts and components have the present device must be exchanged in order to accomplish a change in the scale or size of the autoloader. This reduces the cost of parts and the cost of investment because many parts can be made identical for different sizes of the autoloader.

The present invention is adapted easily to the needs of particular users depending upon how much space is to be consumed and what the storage capacity must be for the particular autoloader. Further, new versions of the present autoloader may be introduced with a minimal of retesting since the majority if components therein are already tested in autoloaders of different sizes.

It is foreseeable that the present autoloader may be scaled by the provision of add on parts or specific parts for each size unit, such as providing these different packaged parts for scaling the autoloader to the end user or to an intermediate manufacturer.

The present autoloader is illustrated with a two U version having two stacked cartridges in each space in the storage magazine. A one U version would be provided with storage magazines having only a single cartridge height storage magazine. In such case, the elevator mechanism may be foregone since there is no need to move the cartridges between levels of the storage magazine to another level of the storage magazine.

All above modules except from Rotator is designed in such a way that they are expandable in the length axis (Y-Axes) and in the height axis (Z-Axis). See X-Y-Z definition in Image 1. The main purpose by doing this is that both the cost of parts and cost of investment can be kept low because many parts can be made identical.

It is easy to adapt the product to the customers need both regarding how space consuming the product shall be and which storage capacity the product shall have.

Since each of the modules are pre-tested, new product versions can be produced with minimum of retest.

The handling of different product variants can be very cost effective.

The Storage System can be expanded in Y and Z axis by use of the same modules and only few "add-on" parts or specific parts for each "U"

Main Chassis & Top Cover:

The Main Chassis is identical for all "U"s within the same Y-dimension (identical concept)

The Main Chassis will have a standard height independent of "U"s. The Top Cover will have different height dependent of "U"s. When changing the Main Chassis Y-dimension, the Top Cover Y-Dimension must be changed accordingly. The concept remains the same.

Front:

The Front height dimension is "U" dependent.

Traverse:

Expandable in Y-direction. The Traverse belt length have to be changed and The Main Chassis structure (traverse guiding included).

Magazine:

The concept is expandable in Y and Z axis. All parts are identical within the cover in Y axes. The concept is identical for change in Z axis; it is only add on of the number of cartridges in the height direction; and the only change is the height of the Parting Walls.

Soft eject is identical for all "U"s and Y axes versions. Ref. Patent application 03TDP0008.

Rotator:

The Rotator is identical for all "U"s.

Elevator: Screw Shafts will be included from 2 "U" and up. The Screw shafts and simple spacer parts are the only "U" specific parts within the Elevator.

FIG. 1 is an perspective view showing.

Image 1—Loader without Top Cover and Rear Wall

Image 2—Traverse Assy

Drawing No. 1—Cartridge magazines

Drawing No 2—Cartridge Magazines, internal parts
Drawing No 3—Cartridge Magazines, parting wall detail
Image 3—Robotics Assy
Image 4—Rotator Assy
Image 5—Traverse Assy (without belt and motor)
Image 6—Main Chassis & Top Cover
The invention.
Image 1—Loader without Top Cover and Rear Wall:
This image shows Main Chassis Assy, Rotator Assy with Tape Cartridge inserted, Elevator Assy and Traverse Assy. Further are Traverse Guides Left and Right shown. The Main Chassis is identical for all "U"s where the Main Chassis Y-Dimension is the same. For different Main Chassis Y-Dimension the Traverse Guide Y-Dimension will have to be changed accordingly. An X-Y-Z definition is shown.

Image 2—Traverse Assy:
Here are the Traverse Base, Traverse Gear Assy, Traverse Belt and Traverse Belt Pulley shown. Further is the Belt Y-Axis Dimension shown. This dimension will have to be changed when the Main Chassis Y-Dimension is changed.

Drawing No. 1—Cartridge Magazines:
The two Cartridge Magazines are shown with the Magazine Y and Z-Dimensions. The Magazine Y-Dimension will be changed in steps of Cartridge columns and the Z-Dimension will be changed in steps of Cartridge rows. The drawing shows a 2 "U" version. A 1 "U" version will have room for only one row of Cartridges.

Drawing No 2—Cartridge Magazines, internal parts:
All Parting Walls 11 and Leaf Springs 40 located inside the Magazine Cover 9 are identical.

When changing the Magazine Y-Dimension it is only the number of Parting Walls 11 with Leaf Springs 40 that have to be changed including the Magazine Cover 9 depth. When changing the Magazine Z-Dimension (different "U"), the Parting Walls have to be changed in height direction (z). The height of the Magazine Cover 9 and the Front Covers 2 and 3 including Magazine Rear End Cover 12 will also have to be changed in height direction, but the concept remains the same.

Drawing No 3—Cartridge Magazines, parting wall detail:
This drawing shows Parting Wall details including Cartridge Latch mechanism, which is an integrated part of the parting wall.

Image 3—Robotics Assy:
The Robotics Assy consists of Traverse Assy, Elevator Assy and Rotator Assy. The Elevator Screw Shafts are shown.

Image 4—Rotator Assy:
The Rotator Assy is identical for all "U"s and for all Main Chassis and Magazine Y-Dimensions.

Image 5—Traverse Assy:
The Traverse Assy Z-Dimension is shown. This dimension will change dependent of the number of Cartridge Rows that shall be accessed in the Magazines. The length of The Screw Shafts must be adjusted accordingly as well as the Extension Parts.

Image 6—Main Chassis & Top Cover:
The Main Chassis and Top Cover Y and Z-Dimension are shown. When changing the Main Chassis Y-dimension, the Top Cover Y-Dimension must be changed accordingly.

The Z-Dimension for the Main Chassis will be the same for all "U"s. The Z-Dimension for the Top Cover will be different for each "U".

Although other modifications and changes may be suggested by those skilled in the art, it is the intention of the inventors to embody within the patent warranted hereon all changes and modifications as reasonably and properly come within the scope of their contribution to the art.

I claim:
1. A data storage and retrieval device, comprising:
a housing selected from a plurality of housings of a plurality of sizes;
a tape drive in said housing;
at least one storage magazine in said housing, said storage magazine having a plurality of storage slots for data cartridges, said storage magazine having a magazine housing selected from a plurality of magazine housings of a plurality of sizes, said selected magazine housing being selected to have a size depending upon a size of said housing that has been selected;
a cartridge shuttle in said housing and operable to transport data cartridges from the storage slots in said data magazine to the tape drive and visa versa, said cartridge shuttle including threaded elevator shafts, said threaded elevator shafts being selected from a plurality of threaded elevator shafts of a plurality of sizes; and
said data storage and retrieval device being scalable to one of a plurality of different sizes in a direction perpendicular to a travel direction of the cartridge shuttle by selecting said housing from said plurality of different sized housings, by selecting said magazine housing from said plurality of different sized magazine housings and by selecting said threaded elevator shafts from said plurality of different sized threaded elevator shafts.

2. A data storage and retrieval device as claimed in Claim 1 wherein said cartridge shuttle is scalable to one of a plurality of different sizes by selecting a corresponding set of said threaded elevator shafts and an elevator bracket of the elevator mechanism from a plurality of said threaded elevator shafts and elevator brackets of different sizes while selecting the other components of the cartridge shuttle of a same size, said threaded elevator shafts being selected depending on a size of said housing selected.

3. A data storage and retrieval device as claimed in Claim 1, wherein said storage magazine of the device is scaled to one of a plurality of different sizes by selecting from among a plurality of different size partition walls of the storage magazine, by selecting from among a plurality of different size end caps and face plates of the storage magazine, and by selecting from among a plurality of different size magazine housings and by changing a number of eject springs required in the storage magazine while selecting other components of the storage magazine of a same size.

4. A data storage and retrieval device as claimed in Claim 1, wherein said cartridge shuttle is scalable to one of a plurality of different sizes in a shuttle transport direction by selecting a belt of the cartridge shuttle from a plurality of belts of different lengths while selecting other components of the cartridge shuttle of a same size.

5. A method for scaling a data storage and retrieval device, comprising the steps of:
providing a first set of components in a single size and providing a second set of components in a plurality of sizes, said first and second components being capable of assembly into an operating data storage and retrieval device, said second set of components including housings in a plurality of sizes and cartridge storage magazines in a plurality of sizes;
selecting a form factor for the data storage and retrieval device from a plurality of form factors;
selecting said second components from among said second set of components for assembly with said first components so that a data storage and retrieval device of said selected form factor is provided, said first components of said single size being used to assemble said data storage and retrieval device regardless of the form factor selected, said selection of a cartridge storage magazine from said cartridge storage magazines in a plurality of sizes being dependent on a size of the housing that has been selected from said housings of a plurality of sizes.

6. A method as claimed in claim 5, wherein said form factor is selected from at least two of 1U, 2U, 3U and 4U form factors.

7. A method as claimed in claim 5, wherein said second set of components includes at least one of the set consisting of a traverse wall, longitudinal wall portions, threaded shafts, elevator support frames, divider walls, front panels, end caps, outer magazine housings, and outer loader housings.

* * * * *